United States Patent
Nader

(10) Patent No.: US 10,072,683 B1
(45) Date of Patent: Sep. 11, 2018

(54) AUTOMATIC TRANSMISSION PISTON WITH SUPPORTED SERVO PIN

(71) Applicant: Sonnax Industries, Inc., Bellows Falls, VT (US)

(72) Inventor: Gregg A. Nader, Chester, VT (US)

(73) Assignee: Sonnax Transmission Company, Bellows Falls, VT (US)

(*) Notice: Subject to any disclaimer, the term of this patent is extended or adjusted under 35 U.S.C. 154(b) by 211 days.

(21) Appl. No.: 14/964,170

(22) Filed: Dec. 9, 2015

Related U.S. Application Data

(60) Provisional application No. 62/089,305, filed on Dec. 9, 2014.

(51) Int. Cl.
  *F16H 61/02* (2006.01)
  *F15B 15/14* (2006.01)

(52) U.S. Cl.
  CPC ...... *F15B 15/1447* (2013.01); *F16H 61/0265* (2013.01)

(58) Field of Classification Search
  CPC ...... F15B 15/1447; F16H 61/0265; F16J 1/12
  USPC .................................. 92/138, 166
  See application file for complete search history.

(56) References Cited

U.S. PATENT DOCUMENTS

| 4,502,351 | A | * | 3/1985 | Gates | F16H 63/3003 137/102 |
|---|---|---|---|---|---|
| 4,881,453 | A | | 11/1989 | Armstrong | |
| 5,016,521 | A | | 5/1991 | Haka | |
| 6,454,241 | B2 | * | 9/2002 | Tamura | F16K 3/18 251/193 |
| 7,047,611 | B1 | | 5/2006 | Rowell et al. | |
| 7,771,144 | B1 | | 8/2010 | Nader et al. | |
| 2004/0244523 | A1 | | 12/2004 | Whitmarsh et al. | |
| 2009/0165638 | A1 | * | 7/2009 | Beattie, Jr. | F16H 63/3026 91/6 |
| 2013/0152778 | A1 | | 6/2013 | Dumas | |

OTHER PUBLICATIONS

Servo Pin Bore Roaming Fixture (Instruction Data Sheet), Sonnax Industries, Inc. (2010).

* cited by examiner

*Primary Examiner* — Thomas E Lazo
*Assistant Examiner* — Daniel Collins
(74) *Attorney, Agent, or Firm* — Downs Rachlin Martin PLLC

(57) ABSTRACT

In an automotive automatic transmission, a force applying piston mounted on a servo pin is supported at both sides of the piston. A first end of the servo pin is conventionally supported in a servo pin bore. A second, extended end is supported in a specially configured support bore formed in the assembly cover. Excentric loading and excessive wear of the servo pin and servo pin bore, which can result in damage to the piston, is reduced or eliminated thereby.

17 Claims, 6 Drawing Sheets

AUTOMATIC TRANSMISSION PISTON WITH SUPPORTED SERVO PIN

RELATED APPLICATION DATA

This application is a nonprovisional application of U.S. Provisional Patent Application Ser. No. 62/089,305, filed Dec. 9, 2014, and titled "Supported Servo Pin", which is incorporated by reference herein in its entirety.

FIELD OF THE INVENTION

The present invention generally relates to the field of automatic transmissions for vehicles. In particular, the present invention is directed to an automatic transmission piston with supported servo pin, and kits and methods for installing same.

BACKGROUND

Hydraulic pistons are used for force application in various places in different types of automatic transmissions. In some instances, such pistons are mounted on a servo pin that extends from one end of the piston. The servo pin typically slides in a bore formed in a part of the transmission housing. In some cases, high loads or excentric loading on the piston may create wear and scoring in the pin bore or on the pin itself, which can restrict the motion of the piston. This in turn can cause damage to the piston and limit its effectiveness. Excentric loading can also contribute to increased friction acting on the piston as it moves.

One exemplary automatic transmission that employs a piston and servo pin of the type described is the Powerglide transmission. FIG. 11 illustrates a cross-sectional view of a conventional Aluminum Powerglide transmission piston assembly 10 with piston 16 and servo pin 18. In this application, the piston and servo pin are used to apply a band clutch (not shown) via hydraulic pressure of the transmission. Hydraulic pressure from the valve body (not shown) is applied through a hole (not shown) in the housing 15 and piston bore 12 to the apply side 24 of the piston, moving the piston and pin down the bore, applying force to the band clutch. The piston is supported on the servo pin, which slides in servo pin bore 14. The band clutch is released by spring force and fluid pressure delivered to the release side 26. The cover 20 is fixed to the piston bore and sealed by cover seal 22. During operation, as mentioned above, the servo pin may bind and not move freely. When this occurs, the piston/pin may not retract completely, leaving the band clutch partially engaged and dragging, which can severely damage the band clutch lining and clutch drum requiring repair. Investigation of a defective prior art servo pin revealed evidence of scoring marks 28 (see FIG. 12) on the outer diameter of piston 16 due to excessive contact with the piston bore.

Previously, such defects and wear have been addressable only by "after-the-fact" solutions that involve reconditioning the worn pin bore. One such prior reconditioning solution is provided by the present Applicant's prior "Servo-Fix" kit, which includes a jig for accurate re-boring of the servo pin bore and installation of a repair sleeve. A bore reconditioning approach to this type of problem is also described in U.S. Pat. No. 7,771,144 entitled "Universal Jig/Work Holding Fixture and Method of Use." Thus, while repair solutions have existed to recondition a servo pin and its bore after it has become damaged, there has remained a need in the art for a solution that prevents the damage before it occurs.

Note that as used herein, "Aluminum Powerglide", "Powerglide" or "Powerglide transmission" refers not only to Powerglide transmissions and parts originally manufactured by General Motors, but also to any aftermarket transmissions or parts substantially conforming to the original dimensions and specifications.

SUMMARY OF THE DISCLOSURE

In one implementation, the present disclosure is directed to a hydraulic piston assembly for applying force in an automotive automatic transmission contained within a transmission housing configured to be mounted in a vehicle. The assembly includes a piston configured to be disposed in a piston bore formed in the automatic transmission housing, the piston having a central longitudinal axis, a hydraulic fluid apply side and a hydraulic fluid return side; a piston cover defining a cover support bore for the servo pin; and a servo pin configured at a first end to be received in a servo pin bore formed in the transmission housing and at an opposite, second end in the cover support bore defined by the piston cover, wherein: the servo pin is coupled to the piston and extends along a central longitudinal axis, the first end of the servo pin extending from the hydraulic fluid release side of the piston to be slidably received in the servo pin bore; and the second end of the servo pin extends from the hydraulic fluid apply side and is slidably disposed in the cover support bore, the first and second ends of the servo pin thereby maintaining the piston in proper alignment in the piston bore.

In another implementation, the present disclosure is directed to a kit for eliminating or reducing wear or binding of a servo pin, or piston mounted on the servo pin, in an automotive automatic transmission, the servo pin and piston forming parts of an existing piston assembly received in a transmission housing. The kit includes a replacement piston assembly cover having a cover support bore formed therein; and an extended length servo pin configured to be received in an existing servo pin bore formed in the transmission housing at a first end and in the cover support bore in the cover at a second end, wherein the servo pin is configured to couple to the existing piston to replace the existing servo pin without modification of the existing piston or existing servo pin bore in the transmission housing.

In still another implementation, the present disclosure is directed to a method for replacing and supporting a servo pin in an automotive automatic transmission piston assembly, the transmission having a housing. The method includes removing an existing cover for an existing piston assembly in the transmission; removing an existing piston assembly including an existing piston and existing servo pin from a piston bore and servo pin bore in the transmission housing; removing the existing servo pin from the existing piston; inserting an extended length servo pin into and through the existing piston; securing the extended length servo pin in the existing piston; replacing the existing piston in the piston bore of the transmission housing with a first end of the extended length servo pin received in the servo pin bore; and installing a replacement cover over the piston bore, the replacement cover defining a cover support bore configured to receive and support a second end of the extended length servo pin.

BRIEF DESCRIPTION OF THE DRAWINGS

For the purpose of illustrating the invention, the drawings show aspects of one or more embodiments of the invention.

However, it should be understood that the present invention is not limited to the precise arrangements and instrumentalities shown in the drawings, wherein.

DETAILED DESCRIPTION

The present application discloses devices, systems, and methods for automatic transmission apply-type pistons and servo pins that reduce or eliminate the problems associated with misalignment and excentric loading in prior designs. Analysis of failed or damaged prior art piston/servo pin assemblies revealed the prior art piston bore may have become jammed due to the piston tilting off-axis in the piston bore, thereby causing the pin/piston to bind and not move freely. This tilting may be due to deficiencies in how the prior art piston is supported. Namely, the present inventors discovered the pin is only supported on one end by the servo pin bore and is unsupported on the cover side. The tilting may also be due to the contact point where the servo pin pushes on a band clutch. The contact point between the servo pin and band clutch is offset from a central longitudinal axis of the pin, which may further promote tilting and causing the piston to bind.

Figure 1:
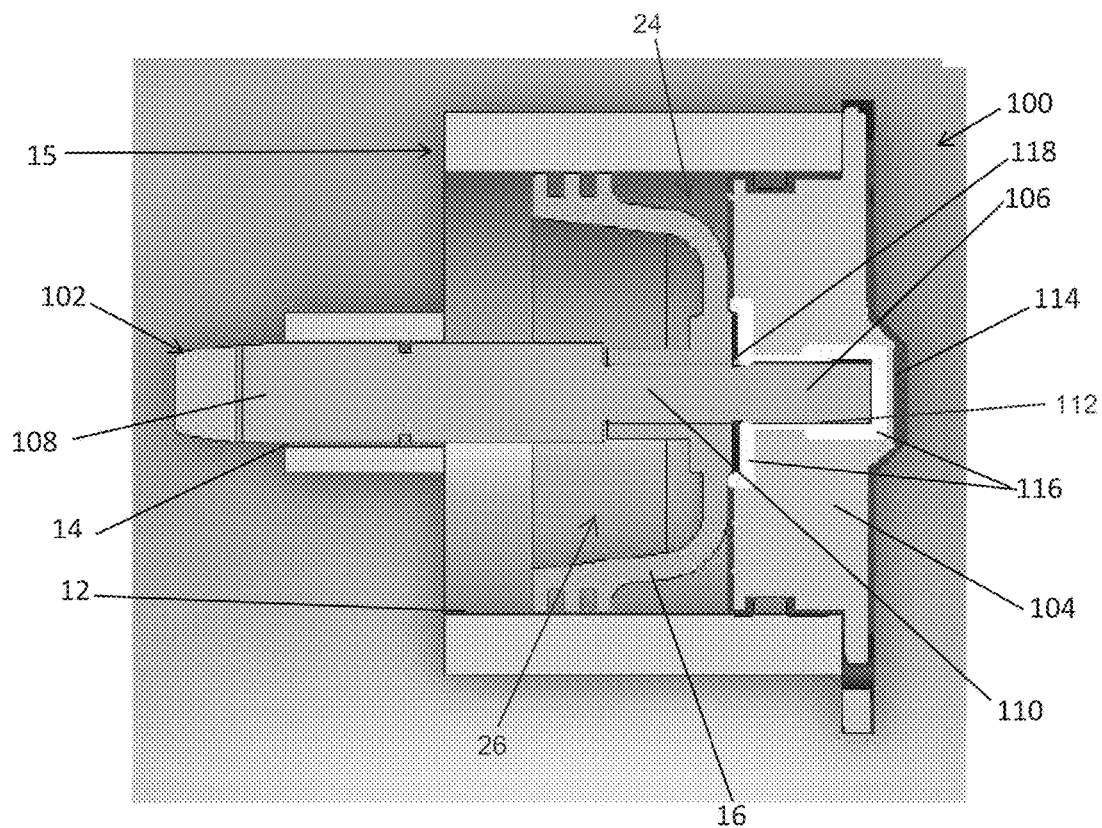
FIG. 1 is schematic cross section of one exemplary embodiment of the present invention as implemented in a Powerglide transmission.
Figure 2:
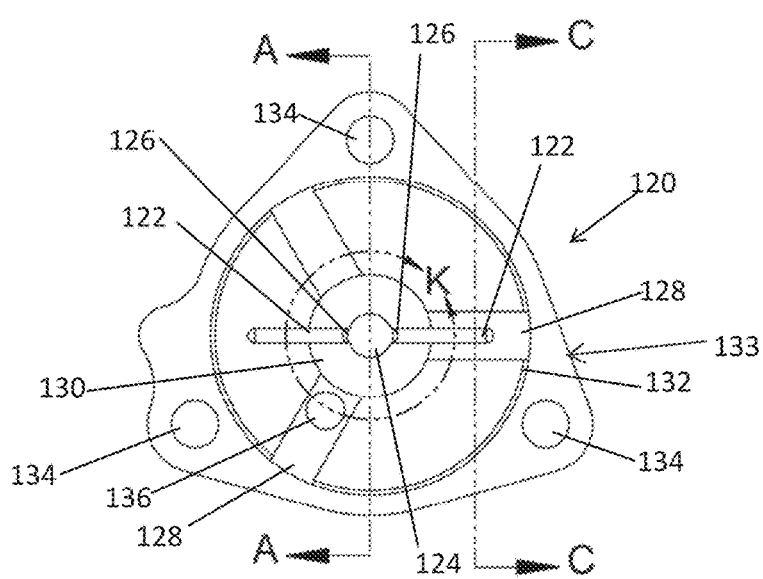
FIG. 2 is a bottom plan view of a cover according to an exemplary embodiment of the present invention.

FIG. 1 illustrates one exemplary embodiment of an apply piston and servo pin assembly 100 according to the present invention. In this embodiment, assembly 100 includes the conventional piston 16, piston bore 12 in the transmission housing 15 and servo pin bore 14. However, servo pin 102 and cover 104 have complementary features to permit the cover to further support the end of extended length portion 106 of the pin to provide greater stability and resistance to high or excentric loads. Such features may keep the piston concentric with the piston bore which may ensure the piston is free to move without binding/jamming, resulting in a more reliable apply or release of the band clutch.

In the exemplary embodiment shown in FIG. 1, servo pin 102 has a first portion 108 configured to be in sliding contact with servo pin bore 14 and a second portion 110 configured to be fixedly coupled to piston 16. Second portion 110 includes an extended length portion 106 that extends opposite the servo pin first portion and into a central support bore 112 formed in cover 104. Central support bore 112 may be configured for a close slip fit with extended length portion 106 to provide support and free movement of the pin in the cover support bore. The close slip fit may be achieved by either machining a bore in the cover to a sufficiently-accurate tolerance or by including a bushing in the servo cover to provide the appropriately toleranced fit. With such configurations, the extended pin may ride in a close slip fit within the servo cover and be supported so that it is supported on both ends of the pin. Where a bushing is not used, inner surfaces of support bore 112 may be treated to increase hardness and wear resistance. For example, if cover 104 is made of aluminum, the surfaces of cover support bore 112 may be hard-coat anodized.

In this exemplary embodiment, support bore 112 has a sufficient depth such that the piston-side face of the cover may come into contact with the piston at its extent of release travel as shown. In order to provide adequate length to permit extended length portion 106 to support the piston at the opposite extent of travel, it may be necessary in some configurations to provide an outer boss 114 on cover 104 to accommodate the necessary depth of cover support bore 112.

Features may be added to maintain hydraulic surface apply area between cover 104 and piston 16, and to provide lubrication within cover support bore 112. Total surface area of the piston and servo pin on apply side 24 may be maintained by a hydraulic pressure balancing pathway 116 exposing the end of extended pin portion 106 to the apply side pressure, which may be provided, for example, by oil grooves in the cover. Balancing pathway 116 allows hydraulic fluid to act upon the pin end just as it would in the prior art design. The balancing pathway may be configured to allow hydraulic fluid to flow to all areas at the end of extended length portion 106 even when the piston is tight against the cover as shown.

As will be appreciated by persons of ordinary skill in the art, embodiments of the present invention may be provided in various forms, such as a complete transmission assembly, a servo pin—piston—cover assembly or as a kit including a servo pin and cover in accordance with the teachings of the present disclosure. In some embodiments, the servo pin may be secured within the piston by a retaining clip 118 as shown in FIG. 1. Other means of securing may be employed by persons of ordinary skill in the art, such as interference fit or various bonding/welding methods.

FIGS. 2-10 illustrate another exemplary cover 120 according to a further alternative embodiment. As shown therein, cover 120 includes a pressure balancing pathway formed by two radially extending grooves 122 spaced approximately 180 degrees apart. Axial grooves extend from radial grooves 122, along the wall of cover support bore 124 to provide the oil path to the bottom of the cover support bore. In alternative embodiments, the number of grooves may vary, including one or more than two. In the illustrated embodiment, grooves 122 extend along a first axis that is substantially perpendicular to a central longitudinal axis of the pin and spaced approximately 90 degrees from a tilting plane. The tilting plane is a plane in which tilting forces, such as the off-center contact point of the band clutch, cause the pin to tilt. Providing such a spacing between the grooves and the tilting axis may help ensure an adequate bearing area between the servo pin and the supporting pin bore 124. In other embodiments, the groove(s) may be located at other angles relative to the tilting plane, while, in one example, maintaining a minimum supported portion of the pin.

Broad radial grooves 128 provide further fluid pressure balancing on the apply side, configured based on the shape and area of piston 16. Piston 16, as shown in FIG. 1, has the configuration of a Powerglide aftermarket piston. Original equipment pistons had a different shape and may require different pressure balancing configurations as may be determined by a person of ordinary skill in the art. Central counter bore 130 is configured and positioned to provide clearance for retaining clip 118 (also in FIG. 1). Cover 120 may be generally comprised of two regions, an inner raised region 132 and an outer flange region 133. Oil passages and the cover support bore as described are located in inner region 132. Outer flange region includes holes 134 for bolting the cover to the transmission housing. Cover 120 also may include oil pressure access port 136, adapted to receive an oil pressure gauge, but which would be normally closed by a threaded plug.

Figure 3:
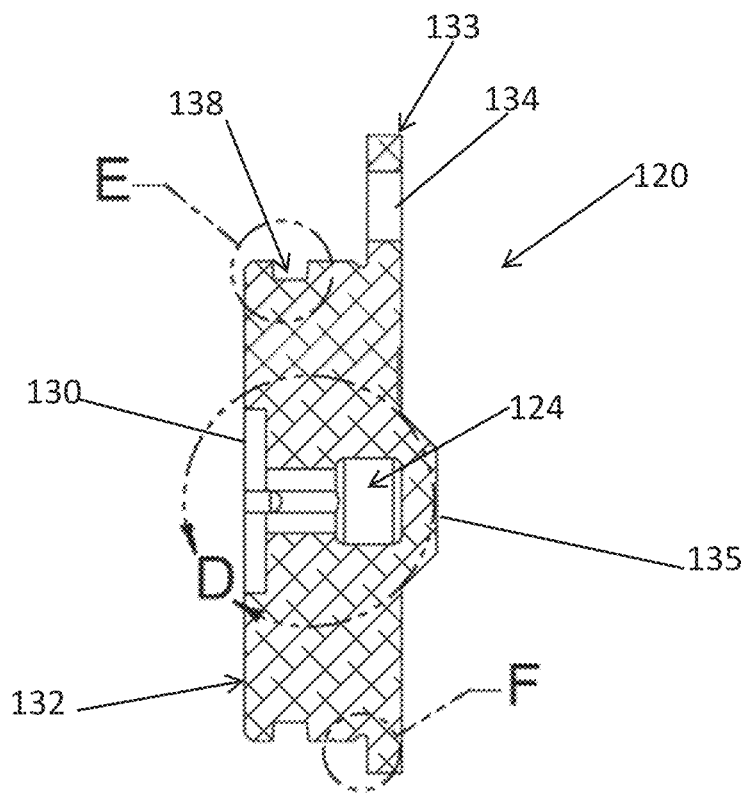
FIG. 3 is a cross-sectional view of the cover of FIG. 2 as viewed along section line A-A in FIG. 2.
Figure 4:
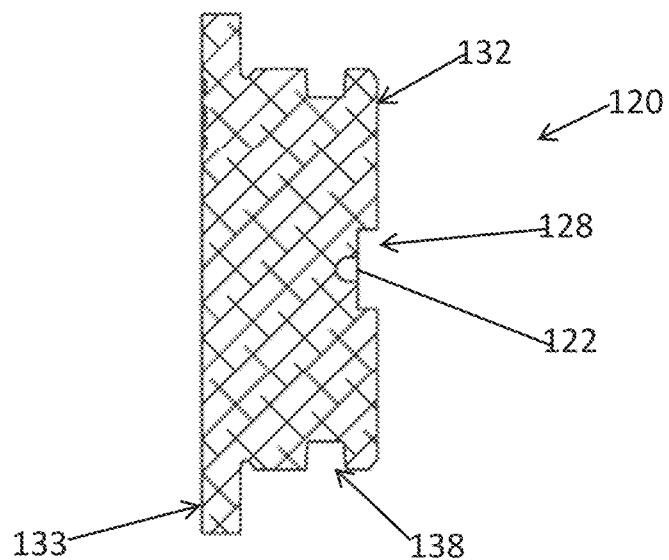
FIG. 4 is another cross-sectional view of the cover of FIG. 2 as viewed along section line C-C in FIG. 2.
Figure 5:
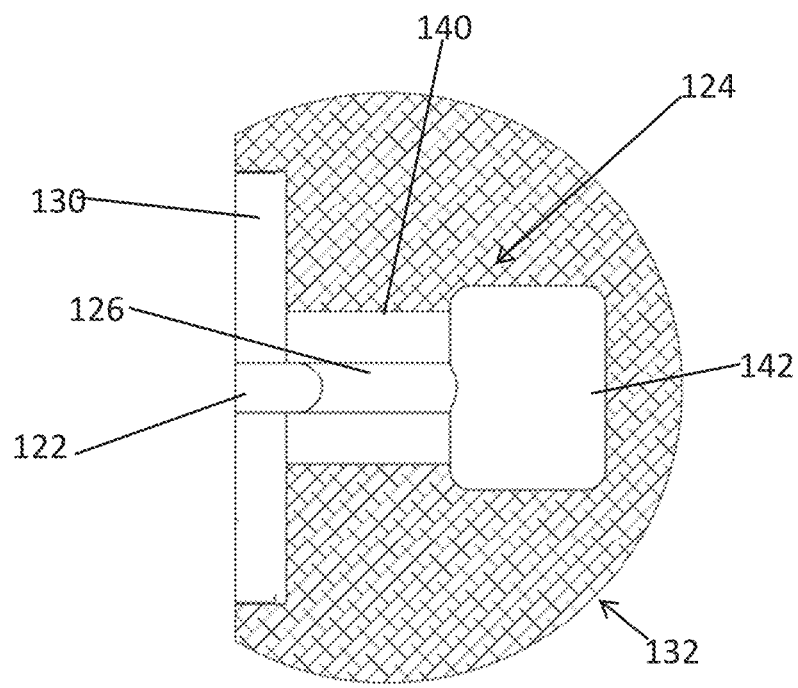
FIG. 5 is a view of detail D as indicated in FIG. 3.
Figure 6:
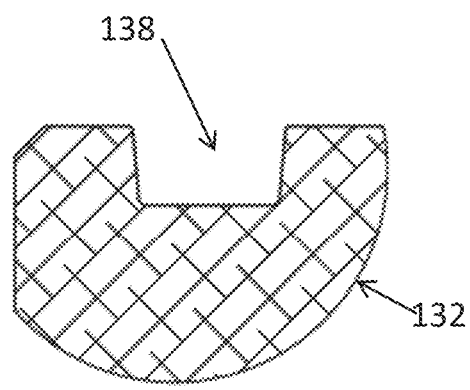
FIG. 6 is a view of detail E as indicated in FIG. 3.
Figure 7:
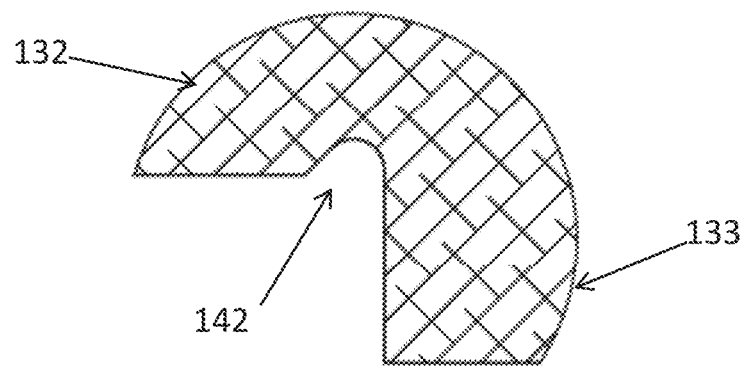
FIG. 7 is a view of detail F as indicated in FIG. 3.
Figure 8:
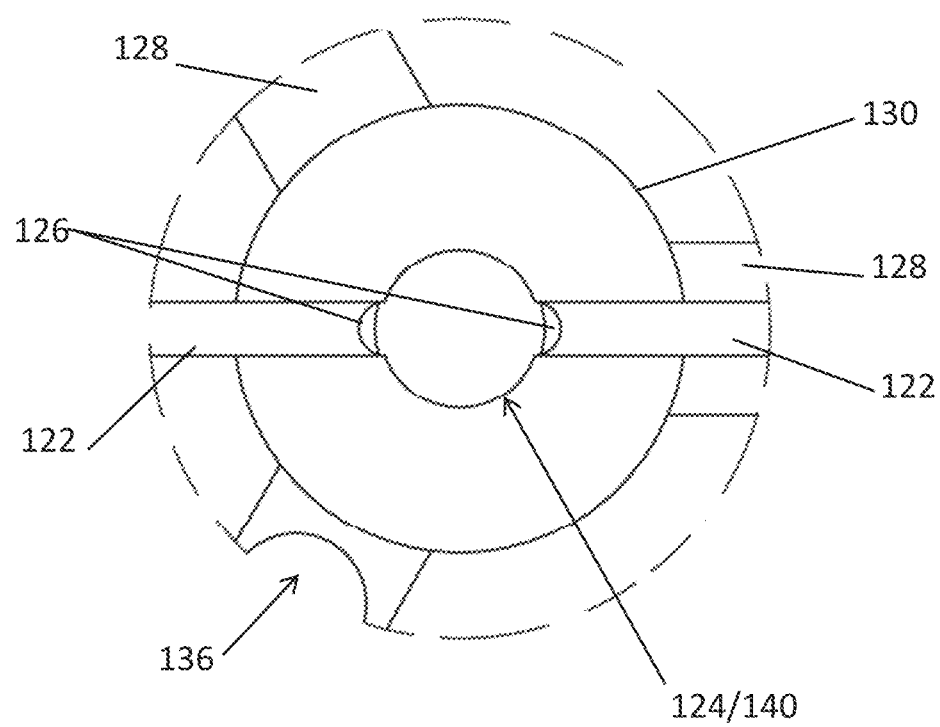
FIG. 8 is a view of detail K as indicated in FIG. 2.
Figure 9:
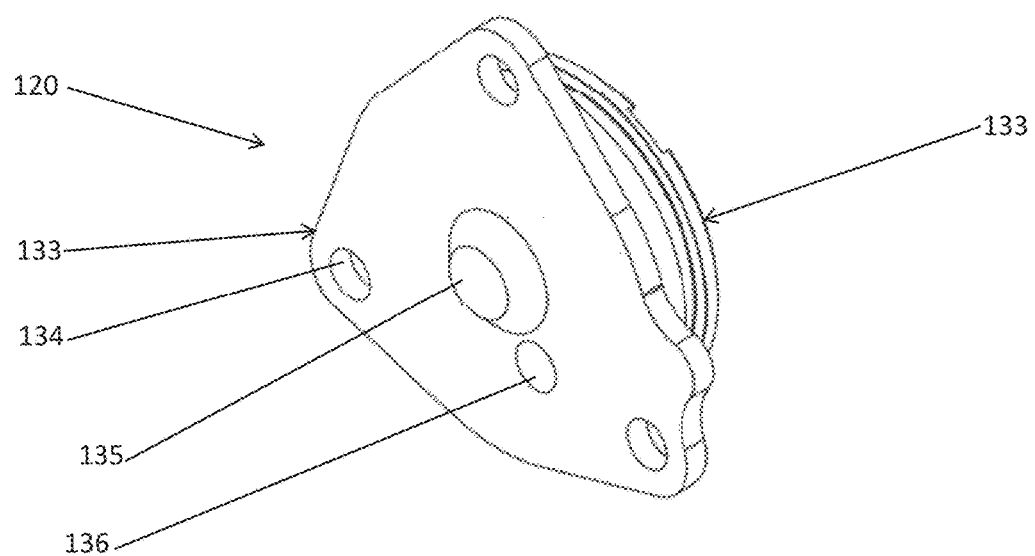
FIG. 9 is a top or outer perspective view of the cover embodiment shown in FIG. 2.
Figure 10:
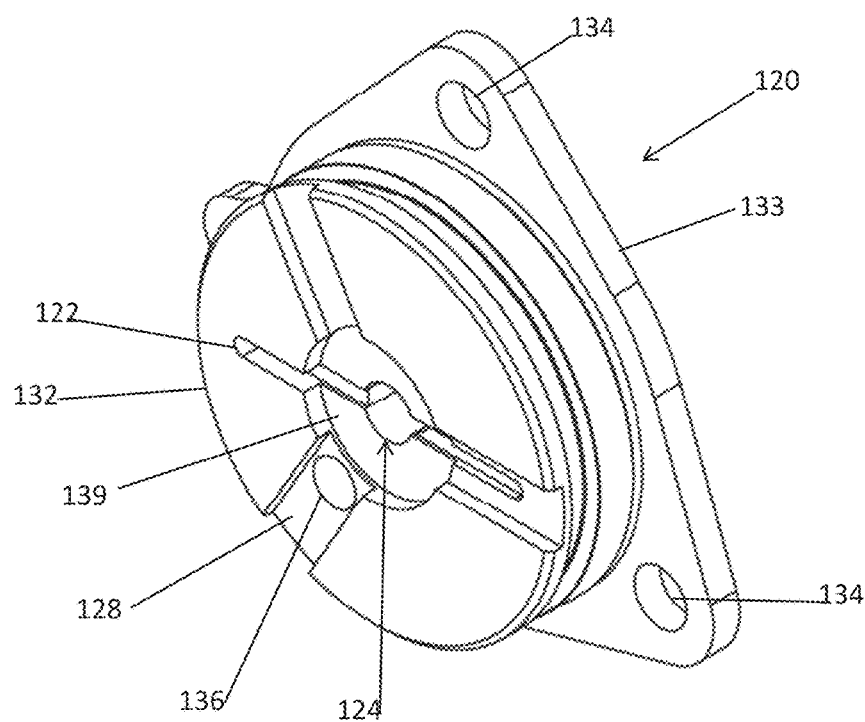
FIG. 10 is a bottom or inner perspective view of the cover embodiment shown in FIG. 2.
Figure 11:
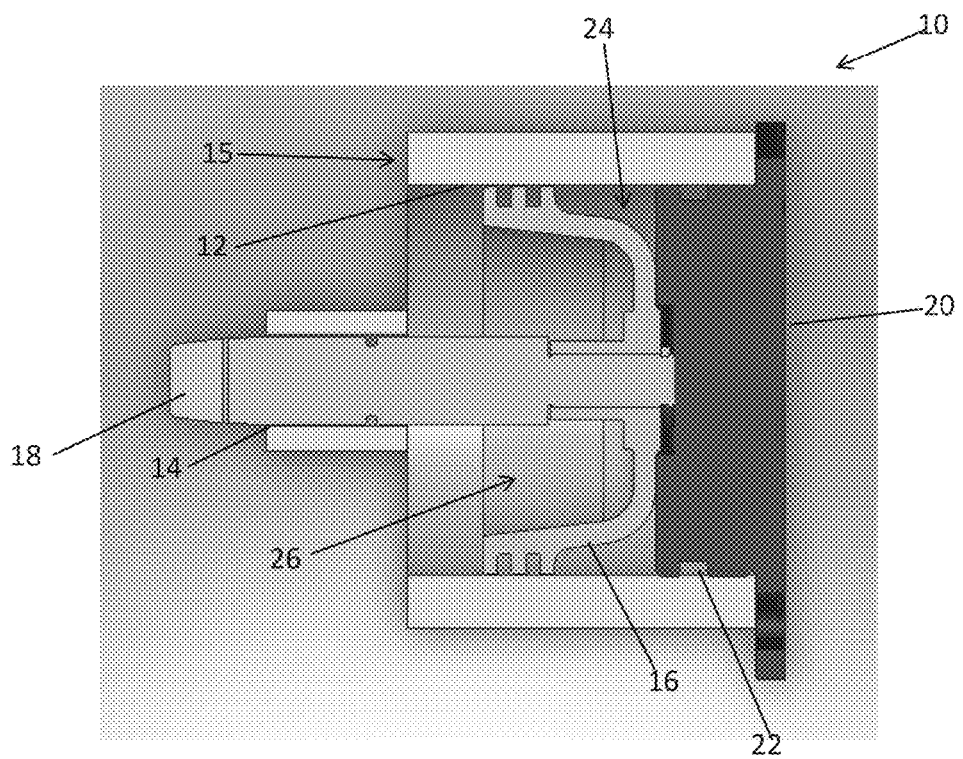
FIG. 11 is a schematic cross section of a prior art Powerglide transmission piston and servo pin.
Figure 12:
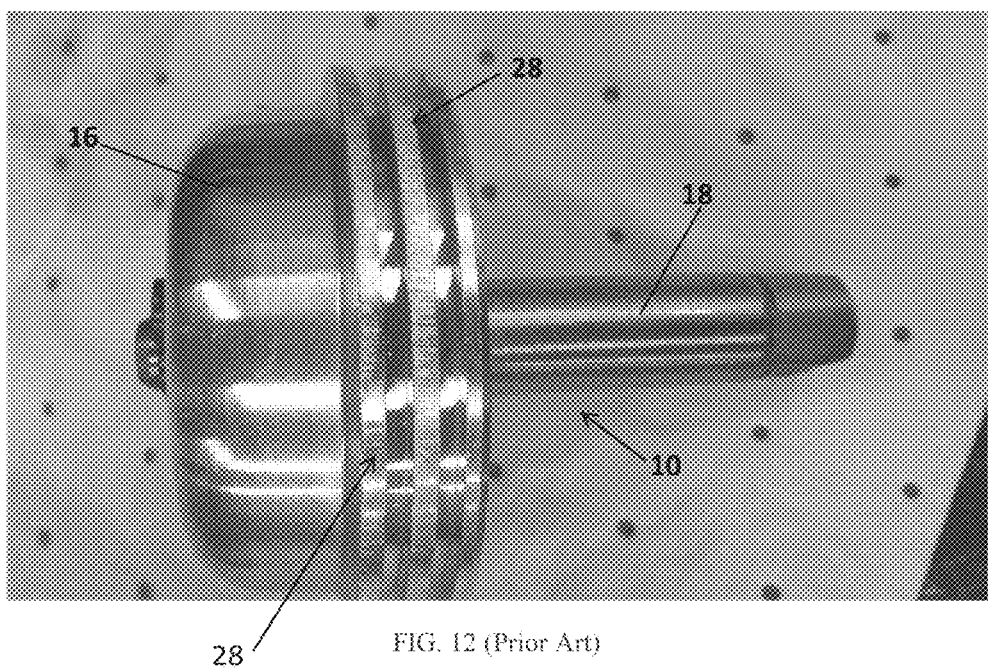
FIG. 12 is a photograph illustrating damage to a prior art piston.

In section A-A, shown in FIG. 3, and section C-C, shown in FIG. 4, more details of cover 120 may be seen. For example, O-ring groove 138 to receive a cover sealing O-ring and boss 135 to accommodate the depth of cover support bore 124 are shown. Also indicated are the locations of details D, E and F, which are shown in FIGS. 5, 6, and 7, respectively. FIG. 7 shows a detail of stress relief undercut 142 between cover regions 132 and 133, and FIG. 6 shows a detail of O-ring groove 138. FIGS. 8, 9, and 10 provide additional views further illustrating features of embodiments as described herein.

With reference to FIG. 5 (detail D), more details of one exemplary embodiment of cover support bore 124 may be described. In this exemplary embodiment, the cover support bore includes a first narrower diameter portion 140 and a second or bottom portion 142 with a larger diameter. First diameter portion 140 is dimensioned for a close sliding fit with the servo pin extended portion as previously described. As will be appreciated by persons skilled in the art, a servo pin such as servo pin 102 (see FIG. 1) may be utilized with cover 120. Narrower diameter portion 140 will have a length as determined adequate for a particular application in order to provide the necessary support for servo pin 102. Bottom portion 142 has a larger diameter to provide a hydraulic fluid reservoir and to provide clearance for the end of servo pin 102, thus reducing the possibility of cover support bore 124 being formed out of tolerance during manufacturing. Vertical grooves 126 deliver oil to bottom portion 142, which in turn are fed by radial grooves 122 as previously described. Counter bore 130 is also shown as previously described.

In some embodiments, the axial length of the bearing surface of cover support bore 124, e.g, narrower diameter portion 140, may be in the range of at least about half the axial length of the bearing surface of existing servo pin bore 14. However, in other embodiments that length may be less than half the axial length of the bearing surface of servo pin bore 14. Length of the bearing surface of cover support bore 124 also may be related to the distance between the two bearing surfaces at opposite ends of extended length servo pin 102, with shorter bearing surfaces being workable with greater spacing as permitted by the piston assembly and cover geometry. For example, with cover support bore 124 in cover xx being farther away from the pivot point between the servo apply side reaction surface and the inner end of the servo pin pushing at an angle on the clutch band, the support added by cover support bore 124 acts through a larger effective moment arm, which in some cases may permit a smaller, i.e., shorter overall axial length, bearing surface in cover support bore 124 (or in both servo pin bore 14 and cover support bore 124) to be more effective in keeping the servo pin in alignment than the existing (i.e. original equipment) support area of the servo pin bore by itself.

In other alternative embodiments, methods for replacing an existing servo pin in an existing piston assembly are provided. Once such exemplary method may include steps such as removing the existing piston assembly cover, removing the existing piston assembly including the existing piston and existing servo pin from their respective bores in the transmission housing, removing the existing servo pin from the existing piston, inserting an extended length servo pin as described hereinabove into and through the existing piston, securing the extended length servo pin in the existing piston, replacing the existing piston in the piston bore of the transmission housing with the first end of the extended length servo pin received in the servo pin bore of the transmission housing, and installing a replacement cover defining a cover support bore over the piston bore with a second end of the extended length servo pin received in and supported by the cover support bore for the servo pin. As will be appreciated by persons of ordinary skill in the art based on the teachings contained herein, such steps may be performed without modification to the existing transmission housing, piston bore, servo pin bore or piston itself. In one further embodiment, securing of the extended length servo pin within the existing piston may comprise securing with a retaining clip such that the existing piston is captured between a shoulder of the extended length servo pin and said retaining clip as shown, for example, in FIG. 1. The retaining clip may be a reused existing retaining clip or a new retaining clip provided with a replacement kit.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A hydraulic piston assembly for applying force in an automotive automatic transmission contained within a transmission housing configured to be mounted in a vehicle, said assembly, comprising:
   a piston configured to be disposed in a piston bore formed in the automatic transmission housing, the piston having a central longitudinal axis, a hydraulic fluid apply side and a hydraulic fluid return side;
   a piston cover defining a cover support bore for the servo pin; and
   a servo pin configured at a first end to be received in a servo pin bore formed in the transmission housing and at an opposite, second end in said cover support bore defined by the piston cover, wherein:
      the servo pin is coupled to the piston and extends along a central longitudinal axis, the first end of the servo pin extending from the hydraulic fluid release side of the piston to be slidably received in the servo pin bore; and
      the second end of the servo pin extends from the hydraulic fluid apply side and is slidably disposed in the cover support bore, the first and second ends of the servo pin thereby maintaining the piston in proper alignment in the piston bore,
   wherein the piston cover includes a face and at least one groove located in the face for providing fluid communication between the face and the cover support bore to provide hydraulic fluid access to the second end of the servo pin when the servo pin is located in the cover support bore.

2. The hydraulic piston assembly according to claim 1, wherein the at least one groove is configured to balance a hydraulic apply surface area of the piston assembly with a hydraulic return surface area on opposite sides of the piston.

3. The hydraulic piston assembly according to claim 1, wherein a contact point on the servo pin with a band clutch of the automatic transmission is radially offset from the central longitudinal axis along a tilting plane, the at least one groove being circumferentially offset from the titling plane to thereby maximize a bearing surface area of the servo pin bore along the tilting plane.

4. A method of supporting a servo pin in an automotive automatic transmission piston assembly including a piston mounted on the servo pin, said method comprising supporting the servo pin in a servo pin bore formed in a transmission housing part on a first side of the piston and supporting the servo pin in a cover support bore formed in a piston assembly cover on a second, opposite side of the piston; and routing piston apply side hydraulic fluid to an end of the servo pin in the cover support bore to provide a hydraulic fluid balance.

5. The method according to claim 4, wherein the cover support bore defines a bearing surface forming a close sliding fit with said servo pin.

6. The method according to claim 4, wherein said supporting reduces binding of the piston or servo pin in their respective bores.

7. The method according to claim 4, wherein the automotive automatic transmission is a Powerglide transmission, and said first side of the piston is a fluid return side and said second side is a fluid apply side.

8. A kit for eliminating or reducing wear or binding of a servo pin, or piston mounted on the servo pin, in an automotive automatic transmission, the servo pin and piston forming parts of an existing piston assembly received in a transmission housing, said kit comprising:
 a replacement piston assembly cover having a cover support bore formed therein; and
 an extended length servo pin configured to be received in an existing servo pin bore formed in the transmission housing at a first end and in said cover support bore in said cover at a second end, wherein the servo pin is configured to couple to the existing piston to replace the existing servo pin without modification of the existing piston or existing servo pin bore in the transmission housing.

9. The kit according to claim 8, wherein a total bearing surface area for supporting the extended length servo pin is increased by at least about one-third by the cover support bore.

10. The kit according to claim 8, further comprising a retaining clip configured to secure the extended length servo pin in the existing piston.

11. The kit according to claim 8, wherein said replacement piston assembly cover defines a hydraulic pressure balancing pathway providing fluid communication between an apply side of the piston and the cover support bore defined by said cover.

12. The kit according to claim 8, wherein;
 the extended length servo pin is configured to extend along the central longitudinal axis of the existing piston assembly with the first end of the extended length servo pin extending from a hydraulic fluid release side of the existing piston and configured to be slidably disposed in the existing servo pin bore formed in the transmission housing; and
 the second end of the extended length servo pin is configured to extend from a hydraulic fluid apply side of the existing piston and configured to be slidably disposed in said cover support bore in the replacement cover, whereby the first and second ends of the extended length servo pin thereby maintain the existing piston in proper alignment in the piston bore when installed in the transmission housing and increase resistance to excentric loads applied to the piston during operation.

13. The kit according to claim 8, wherein said automatic transmission is a Powerglide transmission and the piston controls a band clutch.

14. A method for replacing and supporting a servo pin in an automotive automatic transmission piston assembly, the transmission having a housing, said method comprising:
 removing an existing cover for an existing piston assembly in the transmission;
 removing an existing piston assembly including an existing piston and existing servo pin from a piston bore and servo pin bore in the transmission housing;
 removing the existing servo pin from the existing piston;
 inserting an extended length servo pin into and through the existing piston;
 securing the extended length servo pin in the existing piston;
 replacing the existing piston in the piston bore of the transmission housing with a first end of the extended length servo pin received in the servo pin bore; and
 installing a replacement cover over the piston bore, the replacement cover defining a cover support bore configured to receive and support a second end of the extended length servo pin.

15. The method according to claim 14, wherein said securing comprises securing the extended length servo pin in the existing piston with a retaining clip, with the existing piston captured between a shoulder of the extended length servo pin and said retaining clip.

16. The method according to claim 15, wherein said first end of the extended length servo pin is disposed on a return side of the existing piston and said second end of the extended length piston is disposed on an apply side of the existing piston.

17. The method according to claim 16, wherein pressure on the apply side of the existing piston after replacement is balanced by a pressure balance pathway communicating between the piston apply side and the cover support bore defined by the replacement cover.

* * * * *